United States Patent
Mishalov et al.

(10) Patent No.: US 10,505,830 B2
(45) Date of Patent: Dec. 10, 2019

(54) CONTAINER MONITORING CONFIGURATION DEPLOYMENT

(71) Applicant: HEWLETT PACKARD ENTERPRISE DEVELOPMENT LP, Houston, TX (US)

(72) Inventors: Michael Mishalov, Yehud (IL); Avi Saidian, Yehud (IL); Itamar Cohen, Yehud (IL); Pini Shlomi, Yehud (IL); Erez Yaary, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 360 days.

(21) Appl. No.: 15/234,662

(22) Filed: Aug. 11, 2016

(65) Prior Publication Data
US 2018/0048545 A1 Feb. 15, 2018

(51) Int. Cl.
| | |
|---|---|
| *G06F 15/16* | (2006.01) |
| *H04L 12/26* | (2006.01) |
| *G06F 16/28* | (2019.01) |
| *G06F 16/951* | (2019.01) |
| *H04L 12/24* | (2006.01) |
| *G06F 8/71* | (2018.01) |
| *G06F 9/455* | (2018.01) |
| *G06F 11/30* | (2006.01) |

(52) U.S. Cl.
CPC ............... *H04L 43/08* (2013.01); *G06F 8/71* (2013.01); *G06F 9/45533* (2013.01); *G06F 9/45558* (2013.01); *G06F 11/3055* (2013.01); *G06F 16/285* (2019.01); *G06F 16/951* (2019.01); *H04L 41/08* (2013.01); *G06F 2009/45591* (2013.01)

(58) Field of Classification Search
CPC ......... G06F 17/30598; G06F 17/30864; H04L 41/08; H04L 43/08
See application file for complete search history.

(56) References Cited

U.S. PATENT DOCUMENTS

| | | | | |
|---|---|---|---|---|
| 6,868,539 B1 * | 3/2005 | Travison | ................ | G06F 8/63 717/100 |
| 8,065,676 B1 * | 11/2011 | Sahai | ................ | G06F 9/5077 709/226 |

(Continued)

OTHER PUBLICATIONS

Ismail, U., "Comparing Seven Monitoring Options for Docker," (Web Site), Rancher Labs, Apr. 12, 2015, 33 pages, available at http://rancher.com/comparing-monitoring-options-for-docker-deployments/.

Anonymous, "Axibase Google cAdvisor"; Jun. 30 2016; p. 1-9; XP055416455; Retrieved from the Internet: URL:https://web.archive.org/web/20160630050416/https://axibase.com/products/axibasetime-series-database/writing-data/docker-cadvisor/.

(Continued)

*Primary Examiner* — Moustafa M Meky
*Assistant Examiner* — Thorne E Waugh

(57) ABSTRACT

In one example in accordance with the present disclosure, a method may include determining, by a monitoring server external to a container cluster environment, that a new container has been added to the container cluster environment. The method may include receiving, by the monitoring server, cluster data from the new container and comparing, by the monitoring server, the cluster data to a plurality of configuration templates on the monitoring server. The method may also include determining, by the monitoring server, a configuration template from the plurality appropriate for the new container based on the comparison and deploying the configuration template to monitor the new container.

19 Claims, 3 Drawing Sheets

(56) References Cited

U.S. PATENT DOCUMENTS

| | | | | |
|---|---|---|---|---|
| 8,141,090 | B1* | 3/2012 | Graupner | G06F 9/45558 709/225 |
| 8,347,263 | B1* | 1/2013 | Offer | G06F 8/71 717/104 |
| 8,353,012 | B2* | 1/2013 | Del Real | G06F 21/6218 705/326 |
| 9,396,251 | B1 | 7/2016 | Boudreau et al. | |
| 9,762,438 | B2* | 9/2017 | Anerousis | H04L 41/0806 |
| 9,864,528 | B2* | 1/2018 | Vega-Gonzalez | G06F 3/0619 |
| 2014/0165060 | A1* | 6/2014 | Muller | G06F 9/45533 718/1 |
| 2016/0162312 | A1 | 6/2016 | Doherty et al. | |
| 2016/0205519 | A1* | 7/2016 | Patel | H04L 67/1002 455/518 |
| 2017/0249374 | A1* | 8/2017 | Parees | G06F 17/30598 |
| 2017/0322824 | A1* | 11/2017 | Reuther | G06F 3/0604 |
| 2017/0353496 | A1* | 12/2017 | Pai | G06F 21/53 |
| 2018/0101423 | A1* | 4/2018 | Yoon | G06F 17/30598 |

OTHER PUBLICATIONS

Brian Cooksey, "Chapter 1: Introduction—An Introduction to APIs—Zapier"; Jun. 25, 2016; p. 1-4; XP055416354; Retrieved from the Internet: URL:https://web.archive.org/web/20160625163602/https://zapier.com/learn/apis/chapter-I-introduction-to-apis/.

Ismail Usman, "Rancher Labs Comparing Seven Monitoring Options for Docker Rancher Labs"; Apr. 13, 2016; p. 1-12; XP055416393; Retrieved from the Internet: URL https://web.archive.org/web/20160413001220/http://rancher.com/comparing-monitoring-options-for-docker-deployments/.

Docker, "Docker Swarm API", Jun. 23, 2015, 6 pages. <https://web.archive.org/web/20150623122848/https://docs.docker.com/swarm/api/swarm-api/>.

Erez Yaary, "How healthy is your Dickerized application?", retrieved from the Internet on Sep. 4, 2018, 7 pages. <http://techbeacon.com/how-healthy-your-dockerized-application>.

Mike Kavis, "5 Reasons Why Docker is a Billion Dollar Company", Jul. 16, 2015, 5 pages.

* cited by examiner

CONTAINER MONITORING CONFIGURATION DEPLOYMENT

BACKGROUND

A container is a virtualization method where numerous isolated instances exist within one kernel of an operation system. In other words, a container allows virtualization of a particular instance without virtualization of the entire operating system kernel. The container has emerged as a way to deliver application and service workloads across the continuous integration and continuous delivery (CI/CD) development pipeline and well into production environments virtually unchanged. By allowing application to be decomposed into micro services with distinct functions, the container paradigm has effectively enabled the network to become the application fabric.

BRIEF DESCRIPTION OF THE DRAWINGS

The following detailed description references the drawings, wherein.

DETAILED DESCRIPTION

During workload development and operation of containers, many aspects are considered, such as quality, security, monitoring etc. Those aspects and more are handled by many tools that have their configuration in proprietary and private format and repositories, often apart from the workload code and binaries. This separation may create several severe challenges that impact pace of innovation. For example, testing or monitoring definitions may become out of sync with the workload version and workload operations knowledge may not be properly passed on to operations team as they manage the workload.

Some monitoring tools for containers may be used as agents that usually run on the host either as another container or as an internal application inside the container, which is an addition to an already complicated deployment. Moreover, these tools may involve complex configuration to enable monitoring.

Systems and methods for container monitoring configuration deployment discussed herein leverage built-in configuration templates that can be deployed easily on applications running as containers. When a new container starts, the availability of a pre-defined template is detected for the container and then deployed to fetch internal metrics for the application executing within the container. The systems and methods described herein may allow automatic and dynamic configuration for monitor containers by different (and sometimes incompatible) container deployment tools.

An example method for container monitoring configuration deployment may include determining, by a monitoring server external to a container cluster environment, that a new container has been added to the container cluster environment. The method may include receiving, by the monitoring server, cluster data from the new container and comparing, by the monitoring server, the cluster data to a plurality of configuration templates on the monitoring server. The method may also include determining, by the monitoring server, a configuration template from the plurality appropriate for the new container based on the comparison and deploying the configuration template to monitor the new container.

Figure 1:
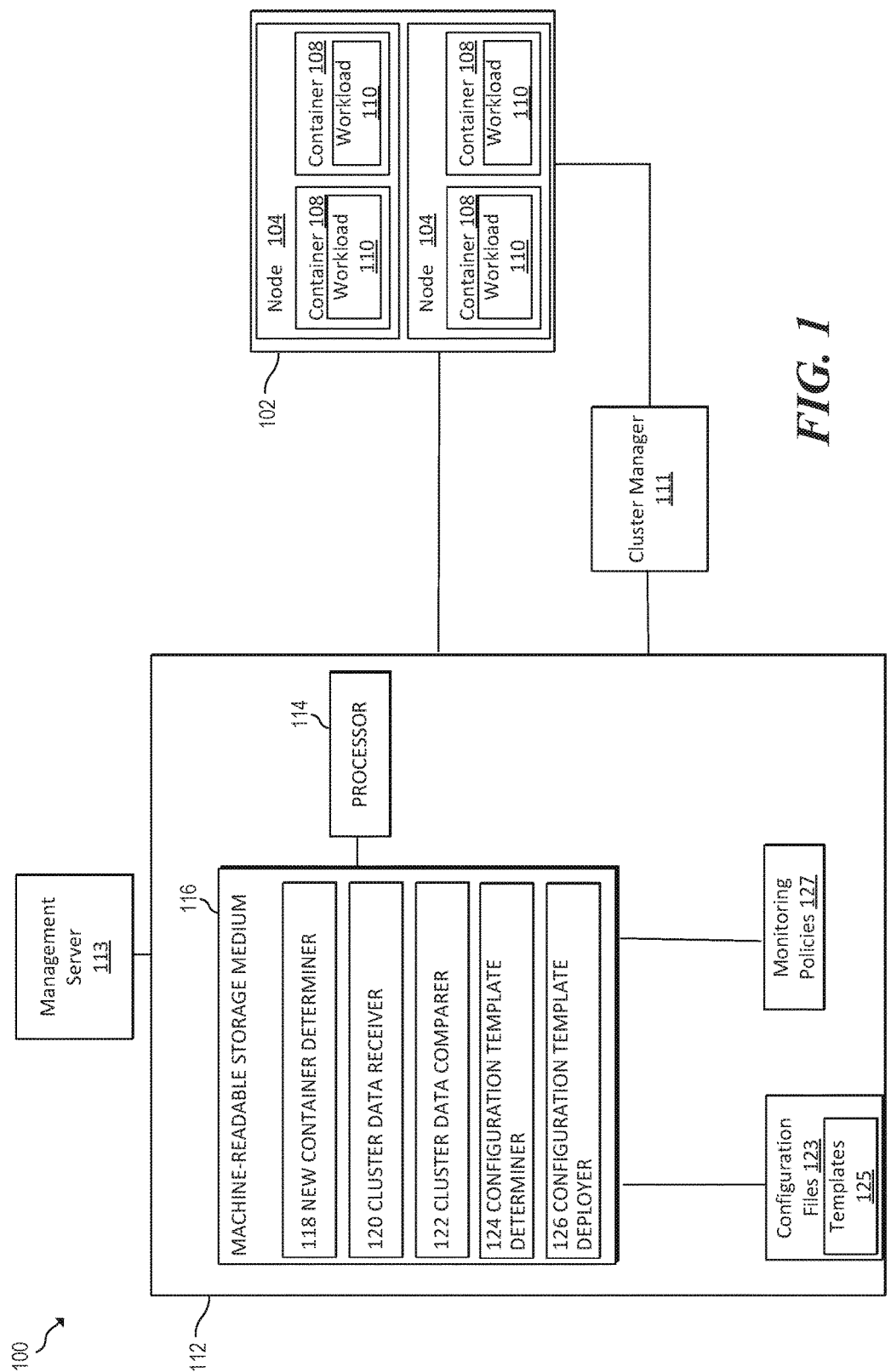
FIG. 1 is a block diagram of an example system for container monitoring configuration deployment.

FIG. 1 is a block diagram of an example environment 100 in which container monitoring configuration deployment may be useful. Environment 100 may include a container environment 102. As described above, a container is a virtualization method where numerous isolated instances exist within one kernel of an operation system. Container environment 102 may include nodes 104. Although FIG. 1 depicts 2 nodes 104, environment 100 can have more or less nodes than two. Each node may be used for executing a container 108. Multiple containers 108 may be executed on each node. Each container 108 may execute a workload, such as an application, scheduled task or perform some other functionality. Some of the containers 108 may be deployed by different container deployment tools. The container environment may include a first container deployed by a first container deployment tool and a second container deployed by a second container deployment tool. For example, containers 108 may be deployed by the Docker Swarm® deployment tool, Kubernetes® deployment tool, etc. The nodes 104 may be managed by a cluster manager 111 which may be a server, management software tool, etc. for managing and deploying containers. Although one cluster manager 111 is depicted in FIG. 1, multiple cluster managers 111 may be present in environment 100.

The stack for each container 108 in container environment 102 may contain five major layers: cluster Manager layer, node (or host) layer in the cluster, container daemon layer that runs on each node, containers layer created by the container daemon, and applications layer that contain applications and/or workloads that runs on each container.

Cluster manager 111 and container environment 102 may also be accessed by monitor 112. Monitor 112 may not execute within cluster environment 102, but rather may be external to cluster environment 102 and/or cluster manager 111. For example, monitor 112 may be executed by a monitoring server 113. Monitor 112 may include agentless monitoring software for monitoring the availability and performance of distributed IT infrastructures, including servers, network devices and services, applications and application components, operating systems and various IT enterprise components. As described above, an agent is a piece of software that usually runs on the host either as another container or as an internal application inside the container. A monitor may be "agentless" if the monitor does not use one of these agents, but rather retrieves information directly from the container, cluster, application, etc. The information may be collected, by example, through the use of standardized Application Programming Interfaces (APIs).

Monitor 112 may include a processor 114 and a memory 116 that may be coupled to each other through a communication link (e.g., a bus). Processor 114 may include a Central Processing Unit (CPU) or another suitable hardware processor. In some examples, memory 116 stores machine readable instructions executed by processor 114 for monitor 112. Memory 116 may include any suitable combination of volatile and/or non-volatile memory, such as combinations of Random Access Memory (RAM), Read-Only Memory (ROM), flash memory, and/or other suitable memory. Memory 116 may also include a random access non-volatile memory that can retain content when the power is off.

Memory 116 may store instructions to be executed by processor 114 including instructions for and/or other components. According to various implementations, monitor 112 may be implemented in hardware and/or a combination of hardware and programming that configures hardware. Furthermore, in FIG. 1 and other Figures described herein, different numbers of components or entities than depicted may be used. Memory 116 may store instructions for monitoring software, including new container determiner 118, cluster data receiver 120, cluster data comparer 122, configuration template determiner 124 and configuration template deployer 126.

Processor 114 may execute instructions of new container determiner 118 to determine, by an agentless monitor, that a new container has been added to the container environment. New container determiner 118 may be run as a scheduled task of monitor 112 and may run periodically, at a configurable frequency, etc. New container determiner 118 may also determine when a new cluster has been added to the container environment.

Processor 114 may execute instructions of cluster data receiver 120 to receive, by the monitor, cluster data from the new container. The cluster data may include container inside data, such as image name of the new container and/or cluster image, running state, container metadata, etc. Cluster data receiver 120 may receive cluster data using an API, such as the Docker inspect API. For example, cluster data received from the new container may be metadata of the new container retrieved using a standardized application programming interface. The container metadata may provide information about the container and/or cluster and may include information about the container, such as name and/or other identifier, type, location, description, version number, license, operating system, memory used, etc. The cluster data may identify a deployment manager of the container.

In some aspects, containers 108 may be deployed by different container managers. That may be structured in different forms. For example on Docker Swarm® the containers may be part of its structure, but on Kubernetes® there may be a Pod which represents a set of containers. In these aspects, monitor 112 may ignore the added layers of the container cluster managers and use a container standardized application programming interface (API), such as the cluster remote API, to directly access the container directly. In this manner, monitor 112 can unify data corresponding to the containers of different cluster managers.

Processor 114 may execute instructions of cluster data matcher 122 to match, by the monitor 112, the cluster data to a plurality of configuration files 123 of monitor 112 to determine a configuration file for the new container. The configuration files 123 may include templates 125 for different types of container images. Cluster data matcher 122 may further map a container image name of the retrieved meta-data to a plurality of container image names included in the plurality of configuration templates and map a container name of the retrieved meta-data to a plurality of container image names included in the plurality of configuration templates The configuration files 123 may be used to automatically deploy a monitor or set of monitors for each container 108 on the nodes 104. Cluster data matcher 122 may determine the appropriate configuration file by comparing particular cluster data to the data contained in the configuration files 123 and/or templates 125. For example, cluster data matcher 122 may use a regular expression to identify the configuration file that is appropriate for the container data. Parameters that may be used by cluster data matcher 122 may include container image name and container name. In some aspects, the container name may not be specified and a general regular expression that includes all container names may be used as the container name value.

Processor 114 may execute instructions of template determiner 124 to determine by the monitor, a template for the new container corresponding to the configuration file. Template determiner 124 may identify a configuration file in the plurality and receive the path to the corresponding template 125. This is the template that will be deployed to monitor the new container.

The monitor 112 may have built-in solution templates 125 that can be deployed easily on applications running as containers. When a new container starts, template determiner 124 may determine the availability of a pre-defined template for the image name. Template determiner 124 may determine the availably using a standardized API, such as for example, the Docker® inspect API. The templates may correspond to a monitoring policy 127 that may define how to monitor a specific container and/or application executing within that container.

Template determiner 124 may further modify the template path with keys derived from the container data, so that the template 125 can be customized for the new container. The keys may include, cluster server name, image name, container deployment manager name, image name, container name, container ID, port numbers, etc. For example, for a Docker Swarm® container, the following keys may be used for the template path: <CLUSTER_SERVER_NAME>, <DOCKER_SERVER_NAME>, <IMAGE_NAME>, <CONTAINER_NAME>, <CONTAINER_ID>, <APP_EXPOSED_PORT>.

For a Kubernetes® cluster, you the following keys may be used for the template path: <CLUSTER_KUBERNETES_POD_NAME>, <CLUSTER_KUBERNETES_POD_ID>, <CLUSTER_KUBERNETES_NAMESPACE_NAME>

Template determiner 124 may also identify the internal port for the container application. This internal port may be used by monitor 112 to extract the exposed port of the container and use it as part of the monitoring template configuration.

Processor 114 may execute instructions of template deployer 126 to deploy the configuration template to monitor the new container. Deploying the configuration template may include generating a new group of monitors for the new container using monitoring policies defined in the configuration template. Monitor 112 may include at least one group for monitoring containers and/or clusters in environment 100. The number of groups may vary. In some aspects, each container may have its own group. For example, a group may be used to apply monitoring policies to application/workload running inside container. In some aspects, multiple containers may be included in the same group. In some aspects each cluster may have its own group. For example, monitor 112 may include one group per cluster with multiple hierarchical metrics that access the health and performance of containers in the cluster.

Template deployer 126 may deploy the template to fetch internal metrics of the application. Metrics may be data that provides information about the operation, performance, etc. of some part of environment 100. Metrics may include response time, memory usage, CPU usage, data throughout, bandwidth usage, latency, throughput, benchmarks, etc. Monitor 112 may monitor the entire container stack. Monitor 122 may collect metrics from any number of the layers of the containers. For example, monitor 122 may collect metrics from the cluster manager layer, node layer, container service layer, container layer and application layer. The monitor 122 may access the cluster API as well as a single node instance API, check its availability, and retrieve Linux host metrics for every registered engine, and fetch the general system metrics and specific metrics on the Docker Daemon. For example, PostgreSQL container can be monitored to get database connection details, Tomcat can be monitored using JMX, and NGINX can be monitored using URL.

Monitor 112 may automatically retrieve metrics for new containers that are created in the cluster environment 102. If a container stops running, a group corresponding to the container may be disabled and may be reenabled once the container continues to run again. If a container is deleted, the group corresponding to the container may also deleted. For example, in environment 100 including a plurality of containers 108, each container may have a corresponding group of monitors on the monitor 112. Monitor 112 may determine that a first container belonging to the plurality is no longer running on the container cluster environment and disable a first group, on the monitoring server, corresponding to the container. As described above, in some aspects, multiple containers may be monitored by the same group. In these aspects, monitor 112 may remove the first container from a group of the monitoring server upon determining that the container has stopped running. The container may be added back to the group if monitor 112 determines that the container is running again.

In some aspects, determining that a new container has been added may include determining, whether a group corresponding to the new container exists and enabling the group for the new container, if it is determined that a group corresponding to the new container exists. This may be done instead of and/or in addition to the elements described above performed by new container determiner 118.

The monitoring data received from the container may be displayed on an output device, such as a monitor. For example, after the templates have been deployed may be unified and consolidated into a single view for display to an output device.

Monitor 112 may receive monitoring metrics from a first container and a second container belonging to the container environment using a standardized API and combine the monitoring metrics from the first container and the second container into a unified view for display on an output device. The monitor 112 may use the standard API to directly access the first container and second container and ignore added management layers of the first and second container deployment tools. The monitor 112 may receive monitoring metrics from a cluster manager layer, node layer, container daemon layer, containers layer, and application layer of the new container.

Figure 2:
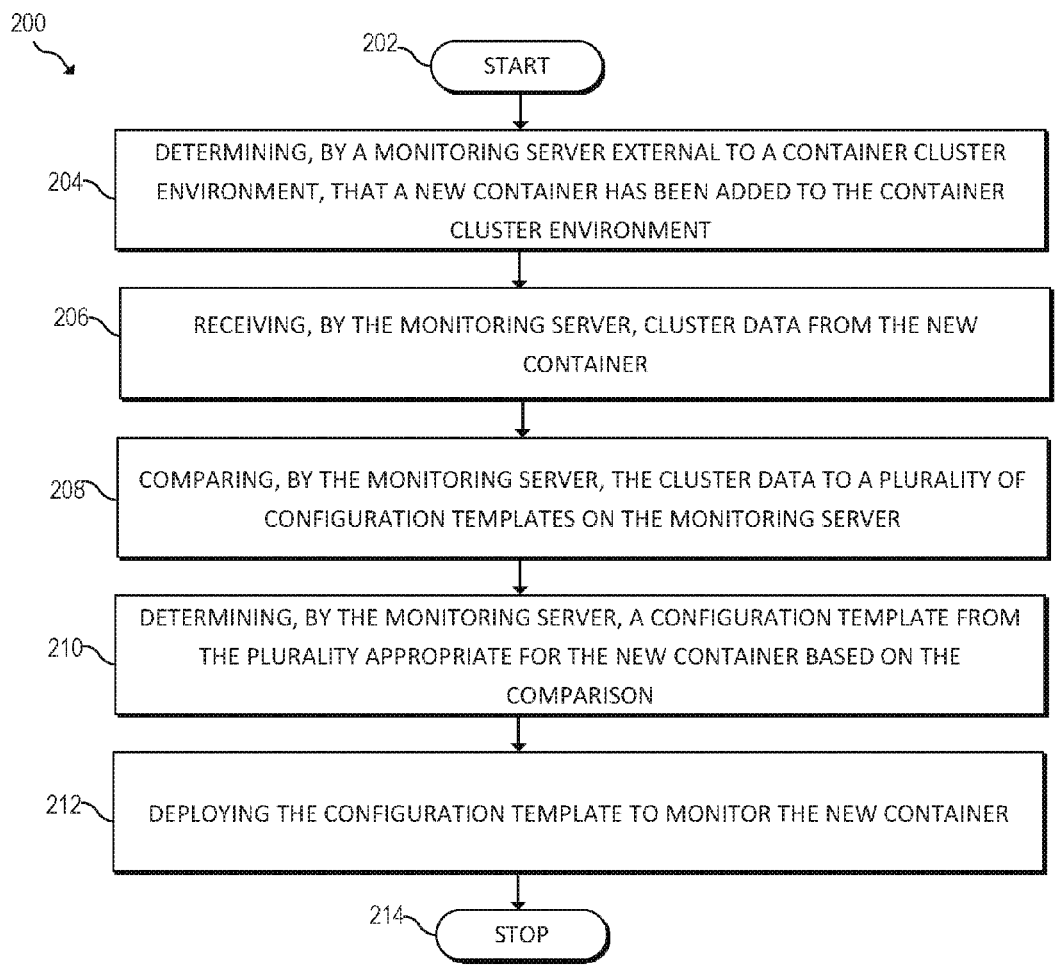
FIG. 2 is a flowchart of an example method for container monitoring configuration deployment.

FIG. 2 is a flowchart of an example method 200 for container monitoring configuration deployment. Method 200 may be described below as being executed or performed by a system, for example, monitor 112 of FIG. 1 or system 300 of FIG. 3. Other suitable systems and/or computing devices may be used as well. Method 200 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 200 may be implemented in the form of electronic circuitry (e.g., hardware). At least one block of method 200 may be executed substantially concurrently or in a different order than shown in FIG. 2. Method 200 may include more or less blocks than are shown in FIG. 2. Some of the blocks of method 200 may, at certain times, be ongoing and/or may repeat.

Method 200 may start at block 202 and continue to block 204, where the method may include determining, by a monitoring server external to a container cluster environment, that a new container has been added to the container cluster environment. The cluster data received from the new container may be metadata of the new cluster retrieved using a standardized application programming interface. The cluster data may include metadata of the cluster image. The cluster data may include an image name of the cluster image. The container environment may include a first container deployed by a first container deployment tool and a second container deployed by a second container deployment tool.

Method 200 may continue to block 206, where the method may include receiving, by the monitoring server, cluster data from the new container. At block 208, the method may include comparing, by the monitoring server, the cluster data to a plurality of configuration templates on the monitoring server. Comparing the cluster data to the plurality of configuration temples may include mapping a container image name of received metadata to a plurality of container image names included in the plurality of configuration templates and mapping a container name of the received metadata to a plurality of container image names included in the plurality of configuration templates. At block 210, the method may include determining, by the monitoring server, a configuration template from the plurality appropriate for the new container based on the comparison. At block 212, the method may include deploying the configuration template to monitor the new container. Method 200 may eventually continue to block 214, where method 200 may stop.

Figure 3:
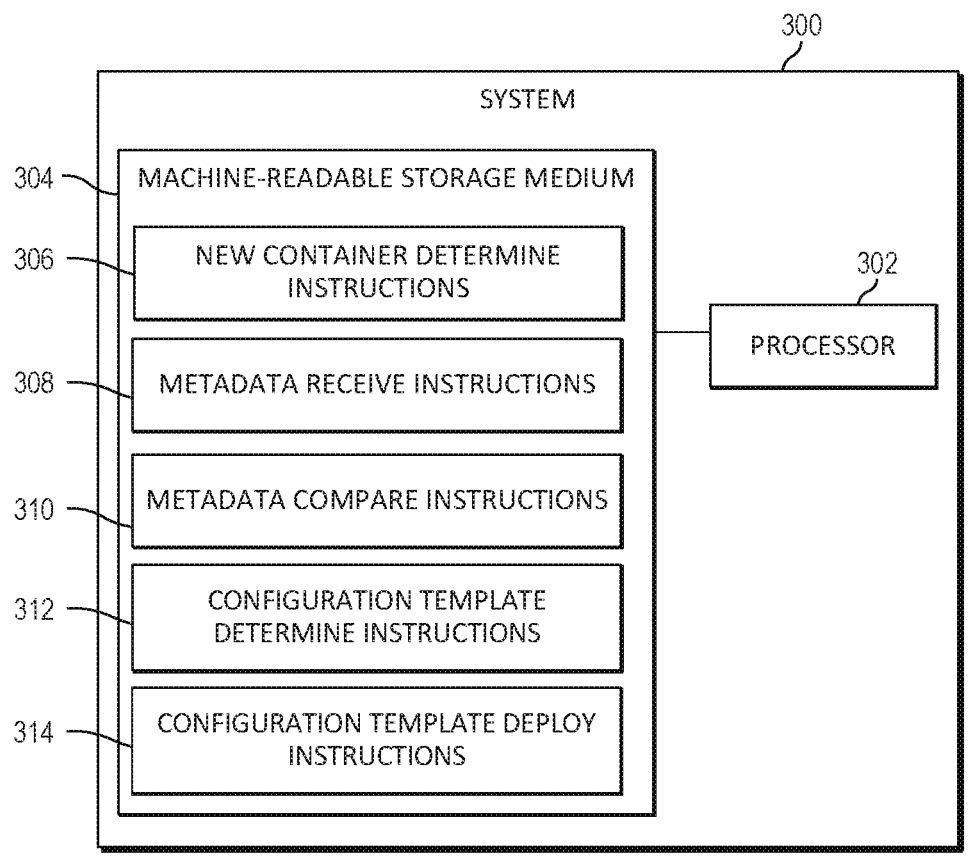
FIG. 3 is a block diagram of an example system for container monitoring configuration deployment.

FIG. 3 is a block diagram of an example system 300 for container monitoring configuration deployment. System 300 may be similar to monitor 112 of FIG. 1, for example. In the example illustrated in FIG. 3, system 300 includes a processor 302 and a machine-readable storage medium 304. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 302 may be at least one central processing unit (CPU), microprocessor, and/or other hardware devices suitable for retrieval and execution of instructions stored in machine-readable storage medium 304. In the example illustrated in FIG. 3, processor 302 may fetch, decode, and execute instructions 306, 308, 310, 312 and 314 to perform container monitoring configuration deployment. Processor 302 may include at least one electronic circuit comprising a number of electronic components for performing the functionality of at least one of the instructions in machine-readable storage medium 304. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 304 may be any electronic, magnetic, optical, or other physical storage device that stores executable instructions. Thus, machine-readable storage medium 304 may be, for example, Random Access Memory (RAM), an Electrically-Erasable Programmable Read-Only Memory (EEPROM), a storage drive, an optical disc, and the like. Machine-readable storage medium 304 may be disposed within system 300, as shown in FIG. 3. In this situation, the executable instructions may be "installed" on the system 300. Machine-readable storage medium 304 may be a portable, external or remote storage medium, for example, that allows system 300 to download the instructions from the portable/external/remote storage medium. In this situation, the executable instructions may be part of an "installation package". As described herein, machine-readable storage medium 304 may be encoded with executable instructions for context aware data backup. The machine-readable storage medium may be non-transitory.

Referring to FIG. 3, new container determine instructions 306, when executed by a processor (e.g., 302), may cause system 300 to determine, by an agentless monitoring service external to a container environment, that a new container has been added to the container environment. Metadata receive instructions 308, when executed by a processor (e.g., 302), may cause system 300 to receive, by the monitoring service, cluster metadata from the new container. Metadata compare instructions 310, when executed by a processor (e.g., 302), may cause system 300 to compare, by the monitoring service, the cluster metadata to a plurality of configuration templates external to the container environment, wherein each configuration template includes corresponding container monitoring policy information. Configuration template determine instructions 312, when executed by a processor (e.g., 302), may cause system 300 to determine, by the monitoring service, a configuration template from the plurality appropriate for the new container based on the comparison. Configuration template deploy instructions 314, when executed by a processor (e.g., 302), may cause system 300 to deploying the configuration template to monitor the new container using container policy information corresponding to the determined configuration template.

The foregoing disclosure describes a number of examples for container monitoring configuration deployment. The disclosed examples may include systems, devices, computer-readable storage media, and methods for container monitoring configuration deployment. For purposes of explanation, certain examples are described with reference to the components illustrated in FIGS. 1-3. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-3 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
   determining, by a monitoring server external to a container cluster environment, that a new container has been added to the container cluster environment;
   receiving, by the monitoring server, metadata of the new container from the new container;
   comparing, by the monitoring server, the metadata of the new container to a plurality of configuration templates for monitoring metrics related to operation of the new container, wherein the plurality of configuration templates is stored on the monitoring server;
   determining, by the monitoring server, a configuration template from the plurality of configuration templates appropriate for monitoring the metrics related to the operation of the new container based on the comparison;
   customizing, by the monitoring server, the configuration template for the new container by modifying a template path of the configuration template with the metadata of the new container; and
   subsequent to customizing the configuration template, deploying the configuration template for the monitoring server to monitor the metrics related to the operation of the new container.

2. The method of claim 1 wherein deploying the configuration template comprises:
   generating a new group of monitors for the new container using monitoring policies defined in the configuration template.

3. The method of claim 1 comprising:
   determining, by the monitoring server, that a first container is no longer running on the container cluster environment; and
   removing the first container from a group of the monitoring server.

4. The method of claim 1 wherein determining that the new container has been added comprises:
   determining whether a group of monitors belonging to a plurality of groups corresponding to the new container exists; and
   enabling the group of monitors for the new container in response to a determination that the group of monitors corresponding to the new container exists.

5. The method of claim 1 wherein the metadata of the new container is received using a standardized application programming interface.

6. The method of claim 1, wherein the metadata of the new container includes an image name and a container name of the new container, and wherein comparing the metadata of the new container to the plurality of configuration temples comprises:
   mapping the image name of the new container to a plurality of container image names included in the plurality of configuration templates; and
   mapping the container name of the new container to the plurality of container image names included in the plurality of configuration templates.

7. The method of claim 1 wherein the container cluster environment includes a first container deployed by a first container deployment tool and a second container deployed by a second container deployment tool.

8. The method of claim 7 comprising:
   retrieving, by the monitoring server, monitoring metrics from the first container and the second container belonging to the container cluster environment using a standardized application programming interface (API); and
   combining the monitoring metrics from the first container and the second container into a unified view for display on an output device, wherein the monitoring server uses the standardized API to directly access the first container and the second container and ignore added management layers of the first and second container deployment tools.

9. The method of claim 1 wherein the metadata of the new container includes an image name of the new container.

10. The method of claim 1 further comprising:
receiving metrics from a cluster manager layer, node layer, container daemon layer, containers layer, and application layer of the new container.

11. A system comprising:
a processor; and
a memory storing instructions that are executable to cause the processor to:
determine that a new container has been added to a container environment;
receive metadata of the new container from the new container;
match the metadata of the new container to a plurality of configuration files to determine a configuration file for monitoring metrics related to operation of the new container;
determine a template for monitoring the metrics related to the operation of the new container corresponding to the configuration file;
customize the template for the new container by modifying a template path of the template with the metadata of the new container; and
subsequent to customizing the template, deploy the template for the processor to monitor the metrics of the operation the new container.

12. The system of claim 11 wherein the metadata of the new container identifies a deployment manager of the new container.

13. The system of claim 11, wherein the metadata of the new container includes an image name and a container name of the new container, and wherein the instructions are further executable to cause the processor to:
map the image name of the new container to a plurality of container image names included in a plurality of configuration templates; and
map the container name of the new container to the plurality of container image names included in the plurality of configuration templates.

14. The system of claim 11 wherein the instructions are further executable to cause the processor to:
receive monitoring metrics from a first container and a second container belonging to the container environment using a standardized application programming interface (API); and
combine the monitoring metrics from the first container and the second container into a unified view for display on an output device, wherein the processor uses the standardized API to directly access the first container and the second container and ignore added management layers of first and second container deployment tools used to deploy the first and second containers, respectively.

15. A non-transitory machine-readable storage medium encoded with instructions, the instructions executable to cause a processor of a monitoring system to:
determine that a new container has been added to a container environment;
receive metadata of the new container from the new container;
compare the metadata of the new container to a plurality of configuration templates for monitoring metrics related to operation of the new container, wherein the plurality of configuration templates is external to the container environment, wherein each configuration template includes corresponding container monitoring policy information;
determine a configuration template from the plurality of configuration templates appropriate for monitoring the metrics of the operation of the new container based on the comparison;
customize the configuration template for the new container by modifying a template path of the configuration template with the metadata of the new container; and
subsequent to customizing the configuration template, deploy the configuration template for the monitoring system to monitor the metrics related to the operation of the new container using the container monitoring policy information corresponding to the configuration template.

16. The non-transitory machine-readable storage medium of claim 15, wherein the instructions are further executable to cause the processor of the monitoring system to:
determine that a first container is no longer running in the container environment, wherein the container environment includes a plurality of containers, each container having a corresponding group on the monitoring system; and
disable a first group of the monitoring system corresponding to the first container.

17. The non-transitory machine-readable storage medium of claim 15, wherein the instructions are further executable to cause the processor of the monitoring system to:
determine whether a group of monitors corresponding to the new container exists; and
enable the group of monitors for the new container in response to a determination that the group of monitors corresponding to the new container exists.

18. The non-transitory machine-readable storage medium of claim 15, wherein the metadata of the new container includes an image name and a container name of the new container, and wherein the instructions are further executable to cause the processor of the monitoring system to:
map the image name of the new container to a plurality of container image names included in the plurality of configuration templates; and
map the container name of the new container to the plurality of container image names included in the plurality of configuration templates.

19. The non-transitory machine-readable storage medium of claim 15, wherein the instructions are further executable to cause the processor of the monitoring system to:
receive monitoring metrics from a first container and a second container belonging to the container environment using a standardized application programming interface (API), wherein the first container is deployed by a first container deployment tool and the second container is deployed by a second container deployment tool; and
combine the monitoring metrics from the first container and the second container into a unified view for display on an output device, wherein the processor uses the standardized API to directly access the first container and the second container and ignore added management layers of the first and second container deployment tools.

* * * * *